United States Patent [19]
Russell

[11] Patent Number: 5,422,519
[45] Date of Patent: Jun. 6, 1995

[54] ELECTRIC POWER AND DATA SIGNAL TRANSMISSION SYSTEM

[75] Inventor: John D. Russell, Hinckley, Great Britain

[73] Assignee: Leigh Steward Products Limited, United Kingdom

[21] Appl. No.: 952,872

[22] PCT Filed: May 22, 1991

[86] PCT No.: PCT/GB91/00845
§ 371 Date: Dec. 23, 1992
§ 102(e) Date: Dec. 23, 1992

[87] PCT Pub. No.: WO91/19361
PCT Pub. Date: Dec. 12, 1991

[30] Foreign Application Priority Data
May 29, 1990 [GB] United Kingdom ............... 9011970

[51] Int. Cl.⁶ ............................................. H01F 38/14
[52] U.S. Cl. ..................................... 307/104; 4/541.3
[58] Field of Search ....................... 336/DIG. 3, 200; 363/95; 307/104; 4/541.3

[56] References Cited

U.S. PATENT DOCUMENTS

| | | | |
|---|---|---|---|
| 4,761,724 | 8/1988 | Brown et al. | 336/132 |
| 4,924,171 | 5/1990 | Baba et al. | 323/347 |
| 4,942,352 | 7/1990 | Sano | 320/2 |
| 4,982,461 | 1/1991 | Mikiya et al. | 4/541.3 |

Primary Examiner—Jeffrey A. Gaffin
Assistant Examiner—Peter Ganjoo
Attorney, Agent, or Firm—Leydig, Voit & Mayer, Ltd.

[57] ABSTRACT

A system is disclosed which allows the transfer of electric power and data signals between two circuits yet allows the circuits to be electrify isolated from one another. The system comprises a loosely-coupled transformer having first and second windings separated by a sheet of insulating material. In one mode an alternating signal is applied by a first processing circuit to the first winding. An alternating signal is generated in the second winding which is rectified and then used as a power supply. In a second mode, a second processing circuit applies pulses to the second winding. Pulses are induced in the first winding which are amplified and output by the first processing circuit. Suitable first and second processing circuits are disclosed.

10 Claims, 2 Drawing Sheets

ELECTRIC POWER AND DATA SIGNAL TRANSMISSION SYSTEM

BACKGROUND TO THE INVENTION

The present invention relates to systems for transmission of electrical power and data signals and in particular to systems which can be used to transmit power and signals between electrical units which must be electrically isolated from each other.

With the increasing use of electrically and electronically controlled appliances, particularly but not exclusively appliances for domestic use, an ever increasing effort must be made to ensure that these appliances are electrically safe.

The consequences of electric shock to a user are rarely higher in the domestic environment than in the bathroom. The designer of appliances to be fitted or used there must pay the highest regard to all practical methods of minimising risks of electric shock to the user, and this is particularly important when the user is required to control the appliance from inside the bathtub or shower.

It is therefore essential that a user be fully protected from a mains or other high voltage electrical power supply employed in operation of a bathroom system such as a whirlpool bath (that is a bath in which jets of air, water, or an air/water mixture are pumped into the bath under the surface of the water); such supply would ordinarily be used in a whirlpool installation to power an air heater and blower which can be controlled by the user. Control circuitry can be arranged to operate at a low, safe, voltage, but danger to the user can still arise from any possibility (through the introduction of water, an electrical fault, or otherwise) of control elements handled by the user becoming live from connection with the high voltage power supply.

SUMMARY OF THE INVENTION

The present invention aims to provide a system through which the controls and control circuits for an appliance can be supplied with power from an external supply and through which the control circuits can send signals generated in response to the user's manipulation of the controls, the system allowing complete electrical isolation between the external supply and the controls and control circuits.

Accordingly, the present invention provides an electric power and data signal transmission system comprising a first and a second transducer each operable to generate a magnetic field in response to an applied electrical signal and to generate a voltage in response to an applied magnetic field said transducers being arranged such that the magnetic field generated when an electric signal is applied to either one of the transducers causes the other one of the transducers to generate a voltage, the transducers being electrically isolated from one another a first processing circuit; and a second processing circuit: the system being operable in mutually-exclusive drive and signal-transmission modes, wherein in the drive mode the first processing circuit is operable to apply an alternating signal to the first transducer and the second processing circuit operable to generate an output supply voltage from voltage signals generated in the second transducer by the application of the alternating signals by the first processing circuit to the first transducer; and in signal-transmission mode the second processing circuit is operable to apply electrical data signals to the second transducer and the first processing circuit is operable to generate an output data signal responsive to a voltage generated in the first transducer by the signals applied to the second transducer.

The system may operate on a time-sharing basis in which data and power transmission take place in separate, mutually exclusive modes. Alternatively, the system may be configured such that data and power transmission can take place simultaneously if required.

Either or both of the transducers may incorporate a winding to generate or detect a magnetic field.

An additional advantage offered by the present invention is that the first and second sides of the system may easily be physically separable from one another. This offers advantages in construction, maintenance and repair of the system.

Preferably the windings are separated by an insulating membrane and to provide greater insulation one or both windings may be completely encapsulated.

The first and second windings may be formed on cores (conveniently C-shaped), the open ends of the cores being placed adjacent one another.

On the second side, a second control circuit may be provided which generates data signals indicative of the states of the controls. These signals are processed by the second processing circuit before being passed across the transformer. The first processing circuit then processes the received signals and then passes them to a first control circuit which controls the operation of an appliance.

The first and second control circuits may conveniently be based around a microprocessor.

One or both transducers may incorporate a plurality of transducing elements each of which is operable either to generate a magnetic field in response to an applied electrical signal or to generate a voltage in response to an applied magnetic field.

A feedback oscillator may be included in the first circuit to generate an oscillating voltage to be transmitted to the second transducer. The first oscillator may also have a tuned circuit in which oscillations are provoked by signals induced in the first transducer. The oscillations can then be amplified to provide the output signal.

From another aspect, the present invention provides an electrical appliance, typically a whirlpool bath, incorporating an electric power and data signal transmission system as defined above.

An embodiment of the invention will now be described in detail, by way of example, with reference to the drawings in which:

DETAILED DESCRIPTION OF AN EMBODIMENT

Figure 1:
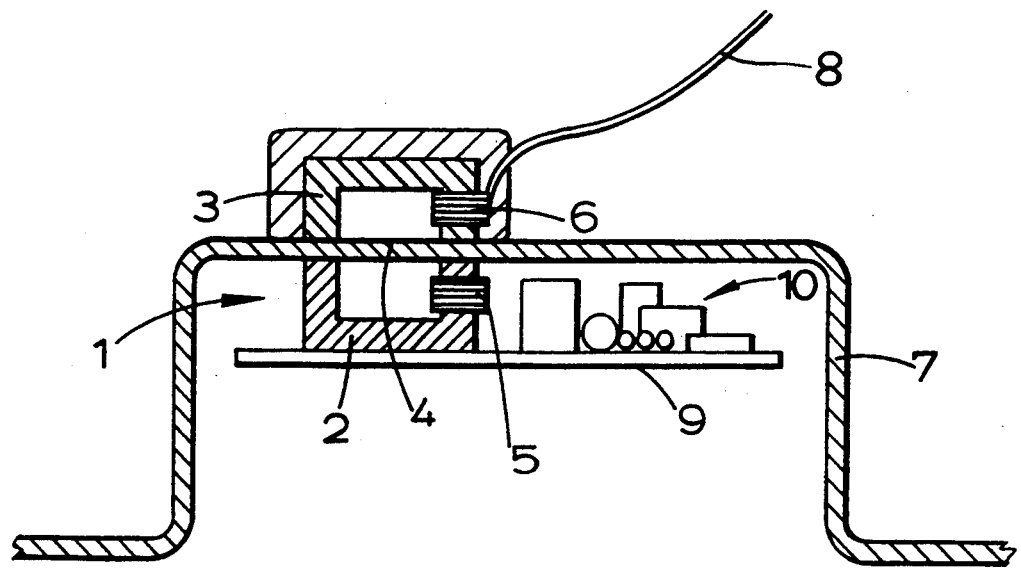
FIG. 1 shows the physical layout of a system embodying the invention as applied to a whirlpool bath.

In a preferred construction as applied to the control of a whirlpool installation (see FIGS. 1, 2 and 3) a loosely-coupled transformer 1 (LCT) comprises a core divided into first and second half-cores 2 and 3 by a skin 4 of an electrically insulating polycarbonate plastics material. The LCT, comprising first and second windings 5 and 6, is arranged to operate at high frequency. The skin thickness, and so the spacing between the core halves, is about 3 mm, and the skin material provides about 400,000 volts of isolation between the two halves.

The skin 4 forms part of an outer shell 7 providing a blower motor housing. The second half-core 3 and winding 4 is potted (encapsulated in resin) and mounted adjacent to the first on the shell 7. A cable 8 leads from the potted second winding 6 to second processing and control circuits. The first winding 5 is associated with drive circuits and a receiver amplifier.

The first winding 5 and half-core 2 are mounted directly onto the circuit board 9 on which the first processing circuit 10 is built.

Figure 2:
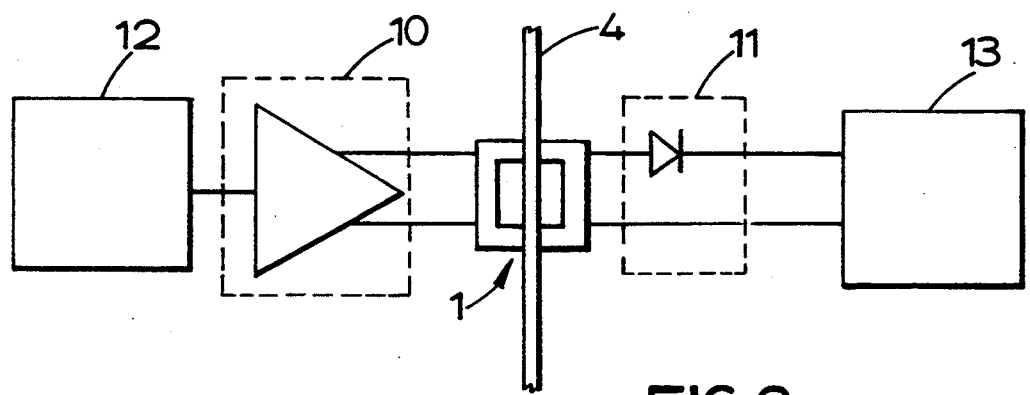
FIG. 2 is a block diagram of the system of FIG. 1 operating in a first mode.
Figure 3:
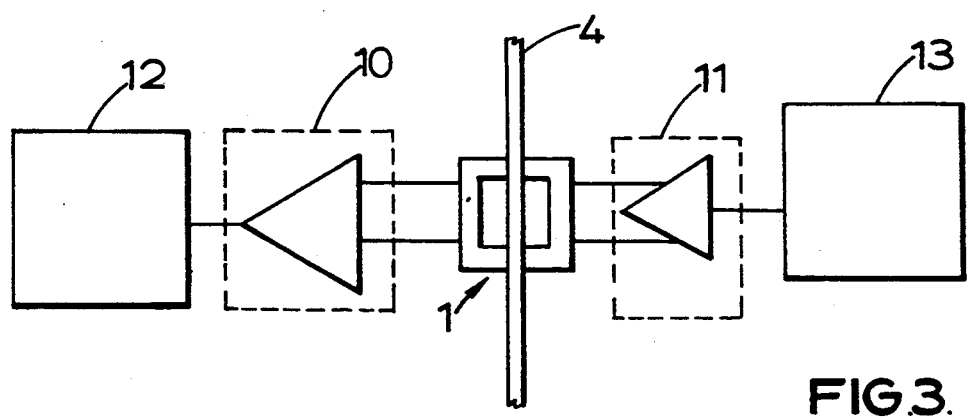
FIG. 3 is a block diagram of the system of FIG. 1 operating in a second mode.

With reference to FIGS. 2 and 3, which diagrammatically illustrate operation of the control system, the LCT is driven with high-frequency pulses (driven mode) from the first side, allowing adequate power transmission to the second circuitry 11, 13. At regular intervals, this power transfer is stopped (signal mode) and user instructions are transmitted back from the second control circuits 13 to the first control circuits 12 across the same transformer 1. The signals on each side of the transformer are processed by first and second processing circuits 10, 11 prior to and after being passed across the transformer 1.

Figure 4:
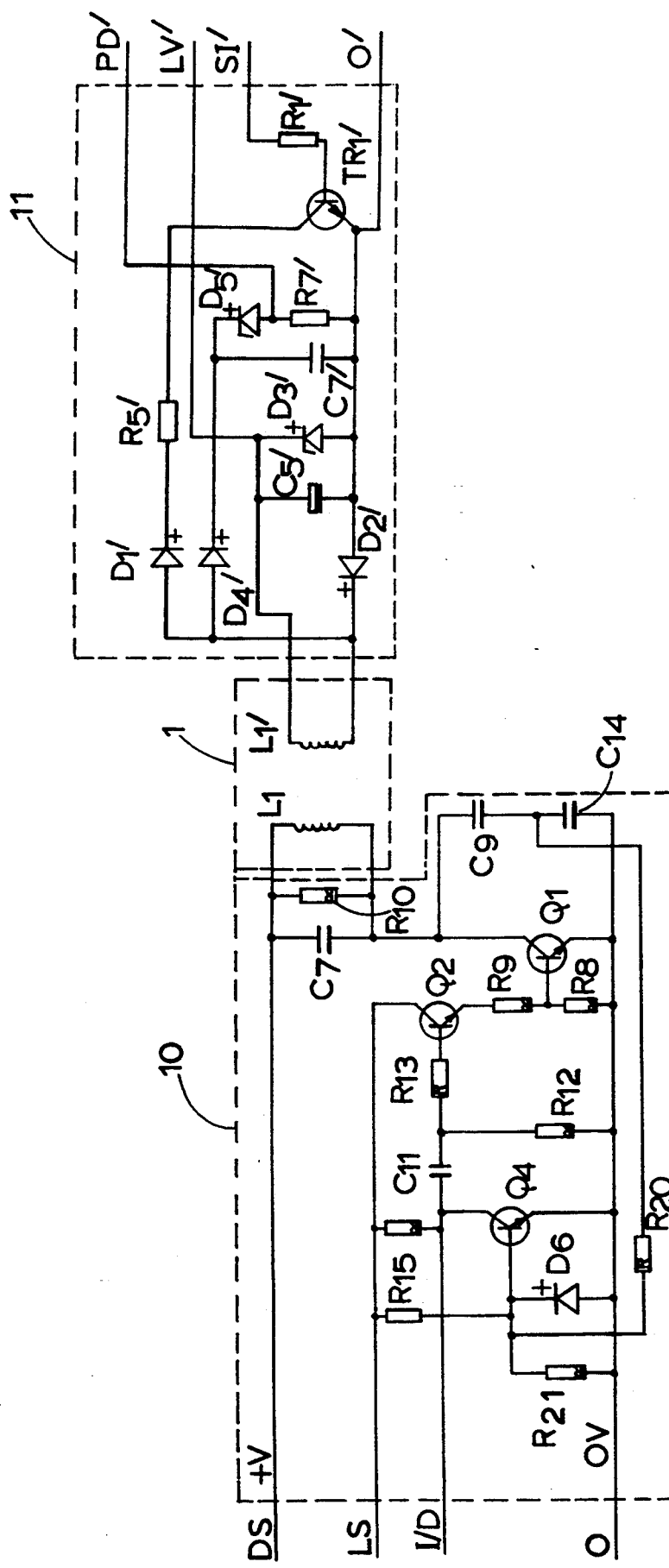
FIG. 4 is a circuit diagram of an embodiment of the invention.

Referring now to FIG. 4, the first winding L1 is connected to a first processing circuit 10 while the second winding is connected to a second processing circuit 11.

The first processing circuit 10 has four input lines: a drive-supply line DS at a supply voltage $+V$, a logic-supply line LS, switchable by a control unit between a supply voltage $V_1$ and a disconnected state, an inhibit-control-and-data line I/D, and a zero-volt line O. The inhibit-control-and-data line I/D also serves as an output line for the data received from the second circuits.

A first side of the first winding L1 is connected to the drive supply line DS. A resistor R10 and a capacitor C7 are both connected in parallel with the first winding L1, all three components together forming a tuned circuit.

Two capacitors C9 and C14 are connected together in series between the zero-volt line O, and the second side of the first winding L1, the capacitor C9, C4 together forming a capacitive voltage divider.

A transistor Q1 is connected in parallel with the capacitors C9 and C14 with its collector connected to the first winding L1 and its emitter connected to the zero-volt line O. A pair of resistors, R8 and R9 are connected in series, one terminal of R8 being connected to the zero-volt line O and the other being connected to both a first terminal of R9 and the base of the transistor Q1.

A transistor Q2 has its collector connected to the logic-supply line LS and its emitter connected to the second terminal of R9. The base of the transistor Q2 is connected to a first terminal of a resistor R13. A capacitor C11 is connected between the inhibit-control-and-data line I/D and the second terminal of the resistor R13. A resistor R12 is connected between the zero-volt line O, and the capacitor C11 and the resistor R13. A further resistor R16 is connected between the logic-supply line LS and the inhibit-control-and-data line I/D.

A transistor Q4 has its collector connected to the inhibit-control-and-data line I/D and its emitter connected to the zero-volt line O. A pair of resistors R15 and R21 are connected in series between the logic-supply line LS and the zero-volt line O to form a voltage divider. The base of the transistor Q4 is connected to a point between these two resistors. A diode D6 is connected between the base of the transistor Q4 and the zero-volt line O, the anode (p-type) side of the diode being connected to the zero-volt line O. The base of the transistor is also connected, through a resistor R20, to the middle point of the capacitive voltage divider formed by the capacitors C9 and C14.

The first circuit has two modes of operation: drive mode in which it transmits power to the second circuit and signal mode in which it receives data from the second circuit.

To initiate drive mode, the inhibit-control-and-data line I/D (which is normally at a high voltage state) is pulsed and the logic supply line is connected to a positive voltage. This pulse signal is transmitted to the base of transistor Q2, the transistor Q2 then producing an amplified output signal on its emitter. The amplified signal then drives the transistor Q1 which causes a voltage pulse to be generated across the tuned circuit C7, R10, L1 which then starts to oscillate. An oscillating voltage is thus set up across the first winding L1 which transmits power to the second winding L1'.

The oscillating voltage produced by the tuned circuit is fed back through the capacitive voltage divider C9, C14 and the resistor R20 to the base of the transistor Q4. The transistor Q4 amplifies the feedback signal, the amplified signal generated at its collector being fed to the inhibit-control-and-data line to act as a pulse which reinitiates the driving sequence. The diode D6 effectively clamps the voltage at the base of the transistor Q4 to zero volts when the signal is in the negative voltage part of its cycle.

In signal mode the logic supply line LS is disconnected. This inhibits the operation of the transistor Q2 so that transistor Q1 is no longer driven and input to the tuned circuit ceases. The oscillations in the tuned circuit will then die out. When a signal is received from the second processing circuit 11 it generates a pulse in the first winding L1. This causes the tuned circuit to oscillate. The oscillating signal generates a voltage across the capacitive voltage divider C9, C14, a signal thus being fed through the resistor R20 to the base of the transistor Q4. The signal is then amplified by the transistor Q4 and fed through the collector of Q4 to the inhibit-control-and-data line I/D from where is passes to the first control circuit 12.

The second processing circuit 11 has two input lines, a signal input SI', and a zero-volt line O'. It also has two output lines: a power detect output PD' and a logic-supply output LV'.

The second winding has a first terminal connected to the logic supply line LV'. Its second terminal is connected, through a diode D2', to the zero-volt line 0' the cathode (n-type) side of the diode D2' being connected to the second winding L1'. A capacitor C5' and a zener diode D3' are connected in parallel between the zero-volt line O' and the logic-voltage line LV', the cathode (n-type) terminal of the zener diode D3' being connected to the logic-voltage line LV'.

A diode D4' has its anode (p-type) terminal connected to the second terminal of the second winding L1'. Its cathode is connected to the zero- volt line 0' through a capacitor C7'. In parallel with the capacitor C7' are a zener diode D5' and a resistor R7' connected in series, the anodes (n-type) terminals of the diodes D4', D5' being connected together. The power-detect output line PD' is connected to a point between the zener diode D5' and the resistor R7'.

A further diode D1' has its anode connected to the second terminal of the second winding L1'. Its cathode is connected through a resistor R5' to the collector of a transistor TR1'. The emitter of the transistor TR1' is connected to the zero-volt line O' and its base is connected, through a resistor R1', to the signal input line SI'.

In operation, signals in the first winding L1 of the transformer generated by the first processing circuit 10 induce an alternating voltage across the second winding L1'.

During a first part of the alternating cycle the diode D4' conducts so charging the capacitor C7'. If the voltage at the capacitor C7' exceeds a threshold then the zener diode D5' will start to conduct so raising the voltage at R7'. The power-detect line PD', being connected to R7', then outputs a high voltage value. The breakdown of the zener diode D5' is arranged to occur only when the magnitude of the signals generated by the second winding L1' are such that the first circuit 10 is in drive mode.

Once the power-detect line PD' goes high, power may be drawn from the logic-voltage line LV' by the second control circuits 13. The logic voltage power supply is taken from the output signal of the second winding L1'. This signal is half wave rectified by the diode D2' (which conducts in the opposite half of the alternating cycle to diode D4'). The rectified signal is smoothed by the capacitor C5' and its voltage is regulated by the zener diode D3'.

When the first processing circuit 10 enters signal mode, the voltage included in the second winding L1' drops so the capacitor C7' discharges through zener diode D5' until conduction through the zener diode D5' ceases. The power-detect line then drops towards 0 V (zero volts). After a delay signals may be sent to the first circuit 10.

Signals are transmitted by the second control circuit 13 pulsing the signal-input line SI'. The pulses are fed through the resistor R1' to the base of the transistor TR1'. As the pulse causes the transistor TR1' to enter its conductive state, current starts to flow from the second control circuits, through the logic voltage line LV' to the second winding L1' then through the diode D1', the resistor R5' and the collector and emitter of TR1'.

The pulses of current in the second winding L1' induce voltage pulses in the first winding L1 which are detected by the first processing circuit 10 as described above.

I claim:

1. A control system for operating controls of a bathing appliance so as to protect a user of the bathing appliance from an electric shock derived from electrical power supplied to the appliance, said system comprising:

(i) first and second transducers separated from one another by an insulating membrane and each operable to generate magnetic fields in response to applied electrical voltage signals and to generate electrical voltage signals in response to applied magnetic fields, said transducers being arranged such that the magnetic fields generated when said applied electrical voltage signals are applied to either one of said transducers causes the other transducer to generate said electrical voltage signals, and said transducers being electrically isolated from one another for protection of the user;

(ii) a first processing circuit operative in a drive mode of said system to apply said applied electrical voltage signals to said first transducer and operative in a signal-transmission mode of said system to generate output data signals responsive to said electrical voltage signals generated in said first transducer, said drive and signal-transmission modes being mutually exclusive;

(iii) a second processing circuit operative in said drive mode of said system to generate an output supply voltage from said electrical voltage signals generated in said second transducer by the application of said applied electrical voltage signals by said first processing circuit to said first transducer and operative in said signal-transmission mode of said system to apply input data signals to said second transducer for said generation of said output data signals by said first processing circuit;

(iv) a first control circuit electrically connected to said first processing circuit and operative to control operation of the appliance in response to said output data signals; and (v) a second control circuit which receives power from said second processing circuit in said drive mode of said system and which is operative to generate said input data signals representing the state of said appliance controls for application to said second transducer by said second processing circuit in said signal-transmission mode.

2. A control system as in claim 1 in which at least one of the first and second transducers incorporates a coil winding.

3. A control system as in claim 2 in which each winding is formed on a core with free ends of the cores being placed adjacent each other.

4. A control system as in claim 3 in which the cores are C-shaped.

5. A control system as in claim 1 in which at least one of the transducers is completely encapsulated in insulating material.

6. A control system as in claim 1 in which at least one of the transducers incorporates more than one element, each element being operable either to generate said magnetic fields in response to said applied electrical voltage signals or to generate said electrical voltage signals in response to said applied magnetic fields.

7. A control system as in claim 1 in which the first processing circuit incorporates a feedback oscillator to generate said applied electrical voltage signals.

8. A control system as in claim 7 in which the first processing circuit generates said output data signals by amplification of a resonance induced in a tuned circuit by voltages generated by the first transducer.

9. A control system as in claim 7 in which said applied electrical voltage signals are high-frequency pulses.

10. A control system as in claim 1 in which at least one of said first and second control circuits incorporate a microprocessor.

* * * * *